United States Patent
Liu et al.

(10) Patent No.: US 12,061,529 B1
(45) Date of Patent: Aug. 13, 2024

(54) AUTOMATIC LEARNING METHOD AND SYSTEM FOR DIGITAL TEST VECTOR

(71) Applicant: Macrotest Semiconductor Inc., Nanjing (CN)

(72) Inventors: Wanchao Liu, Nanjing (CN); Guoliang Mao, Nanjing (CN)

(73) Assignee: Macrotest Semiconductor Inc.

( * ) Notice: Subject to any disclaimer, the term of this patent is extended or adjusted under 35 U.S.C. 154(b) by 0 days.

(21) Appl. No.: 17/801,525

(22) PCT Filed: Apr. 18, 2022

(86) PCT No.: PCT/CN2022/087321
§ 371 (c)(1),
(2) Date: Aug. 23, 2022

(87) PCT Pub. No.: WO2023/060863
PCT Pub. Date: Apr. 20, 2023

(30) Foreign Application Priority Data

Oct. 14, 2021 (CN) .......................... 202111196378.X

(51) Int. Cl.
*G06F 11/22* (2006.01)
*G06F 11/263* (2006.01)

(52) U.S. Cl.
CPC ........ *G06F 11/2221* (2013.01); *G06F 11/263* (2013.01)

(58) Field of Classification Search
CPC .......................... G06F 11/2221; G06F 11/263
See application file for complete search history.

(56) References Cited

U.S. PATENT DOCUMENTS

| 5,295,091 A * | 3/1994 | DeWit | G06F 18/24143 |
| | | | 708/801 |
| 2008/0228744 A1 | 9/2008 | Desbiens | |
| 2009/0116557 A1 | 5/2009 | Nair | |
| 2011/0204910 A1* | 8/2011 | Suto | G01R 31/2815 |
| | | | 29/829 |
| 2018/0188320 A1* | 7/2018 | Sitzman | G01R 31/318552 |
| 2018/0188768 A1* | 7/2018 | Skjoldborg | H04R 3/00 |
| 2019/0018061 A1* | 1/2019 | Gentner | G01R 31/31919 |
| 2019/0056441 A1 | 2/2019 | Heuel et al. | |

* cited by examiner

*Primary Examiner* — Matthew M Kim
*Assistant Examiner* — Matthew N Putaraksa
(74) *Attorney, Agent, or Firm* — Jose Cherson Weissbrot

(57) ABSTRACT

The present disclosure discloses an automatic learning method and system for a digital test vector. The system includes an upper computer, a pattern generator PG, a driver DRIVER, a comparator COMPARE and a history random access memory HRAM. The method includes: writing a pattern file, the pattern file including an input pin timing and an output pin timing, wherein the input pin timing is provided by a device under test, and the output pin timing is configured to be in a learning state; running the pattern file, and recording a running state; reading recorded running state data, and acquiring an output pin state, recorded within certain time, in the running state data; and correcting the output pin timing in the running pattern file according to the acquired output pin state to obtain a corrected output timing, thus obtaining a corrected pattern file. The present disclosure greatly improves the development efficiency, reduces writing of the characteristic of an output pin of a chip, and lowers the writing difficulty.

4 Claims, 7 Drawing Sheets

| CLK | DIRVER | COMPARE | EN |
|---|---|---|---|
| 0 | 0 | X | 0 |
| 1 | 1 | E | 1 |
| 0 | 1 | E | 1 |
| 1 | 1 | E | 1 |
| 0 | 0 | E | 1 |
| ⋮ | ⋮ | ⋮ | ⋮ |
| 1 | 0 | E | 1 |
| 0 | 0 | E | 0 |

FIG. 6

AUTOMATIC LEARNING METHOD AND SYSTEM FOR DIGITAL TEST VECTOR

TECHNICAL FIELD

The present disclosure relates to a writing and debugging method and system for a digital vector, and belongs to the technical field of electronics.

BACKGROUND

According to functions of Integrated Circuit (IC) testing, ICs are divided into a digital (IC), an analog IC and a digital/analog hybrid IC. In digital IC testing, writing a test program is complicated and labor-intensive. However, it is most important to write and debug digital vectors.

As a current chip has more and more complex logic functions, there are more and more test cases to be written. A drive pin logic of a device under test needs to be written, and a corresponding output logic also needs to be written. When the characteristic of a new product needs to be verified, it is more complicated to verify functions of a output pin of a chip. Patterns of corresponding CLK, Driver, a theoretical output state signal and the like can only be written according to a theoretical state of the device under test. However, when there are some fluctuations in timing during outputting, it is very difficult for debugging in the vicinity of a change. Modification and debugging need to be carried out for multiple times, and repeated work is extremely labor-intensive. An operation method is as shown in FIG. 1. A pattern file is written and run; if the running fails, the pattern file is modified and debugged manually until the running succeeds.

Since a file is manually repeatedly modified and verified by testing personnel in the existing technology, there is a lot of repetition work in this process. The pattern timing is complex and prone to errors, so that the development efficiency is greatly reduced.

SUMMARY

Purposes of this invention: In order to overcome the deficiencies in the existing technology, the present disclosure provides an automatic learning method and system for a digital test vector. In the present invention, the writing and debugging efficiency of a pattern vector is improved; and the problems of high vector writing difficulty and low debugging efficiency of a complicated logic chip are solved. The writing efficiency of a digital vector is greatly improved, and the debugging difficulty is lowered.

Technical solution: in order to achieve the above purpose, the present disclosure adopts the technical solution below.

An automatic learning method for a digital test vector includes the following steps:

step 1, writing a pattern file, the pattern file including an input pin timing and an output pin timing, wherein the input pin timing is provided by a device under test, and the output pin timing is configured to be in a learning state;

step 2, running the pattern file, and recording a running state;

step 3, reading recorded running state data, and acquiring an output pin state, recorded within certain time, in the running state data;

step 4, correcting the output pin timing in the pattern file run at step 2 according to the output pin state acquired at step 3 to obtain a corrected output timing, thus obtaining a corrected pattern file;

step 5, executing steps 2-4 on the corrected pattern file obtained at step 4 until the corrected pattern file is within a set threshold range, and completing the correction of the pattern file to obtain a final pattern file.

Preferably, a method for configuring the output pin timing to be in the learning state is describing a data bit of the output pin timing by "E".

Preferably, in step 4, a method for correcting the output pin timing in the pattern file run at step 2 is replacing "E" at the corresponding data bit of the output pin timing in the pattern file by the output pin state acquired at step 3 to obtain the corrected output pin timing.

Preferably, the input pin timing in step 1 includes a clock timing, a drive data timing and an enable signal timing.

An automatic leaning system for a digital test vector includes an upper computer, a pattern generator PG, a driver DRIVER, a comparator COMPARE and a history random access memory HRAM.

The upper computer is configured for writing a pattern file, and sending written pattern file information to the pattern generator. The pattern file includes an input pin timing and an output pin timing. The upper computer is configured for generating an information reading control signal, reading, by means of the information reading control signal, an output pin timing based on the output pin state and recorded in the history random access memory HRAM, and correcting, according to the output pin timing based on the output pin state, the output pin timing in the pattern file to obtain a corrected output pin timing, thus obtaining a corrected pattern file.

The pattern generator PG is configured for performing parsing according to the pattern file sent by the upper computer to obtain the input pin timing and the output pin timing, and sending the input pin timing and the output pin timing to the driver DRIVER and the comparator COMPARE.

The driver DRIVER generates a drive signal according to the input pin timing and the output pin timing to drive a device under test.

The comparator COMPARE collects an output pin state generated by the device under test, compares the output pin state with the output pin timing, fills a corresponding position in the output pin timing with the output pin state to obtain the output pin timing based on the output pin state, and sends the input pin timing and the output pin timing based on the output pin state to the history random access memory HRAM.

The history random access memory HRAM is configured for storing the input pin timing and the output pin timing based on the output pin state.

Preferably, the upper computer is a Personal Computer (PC).

Compared with the prior art, the present disclosure has the following beneficial effects:

1. The present disclosure adopts self-verification of a pattern file, so that the development difficulty is greatly lowered, and the efficiency is improved. A user only needs to write an input timing of a chip, and writes a specific comparison signal to an output pin; an output characteristic of a device under test can be obtained by means of running this pattern file, and functions of the device under test are checked by checking a manual of the device, thus greatly improving the development efficiency, reducing the writing of the characteristic of the output pin of the chip, and lowering the writing difficulty.

2. The characteristic of the output pin of the chip can be ignored while the pattern file is written, so that the time for writing the pattern file is greatly saved, and the efficiency is improved.

3. The characteristic of a new product is known by learning the characteristic of the output pin.

4. Debugging of the pattern file by a user is reduced. An expected effect can be achieved by modifying little of the output pattern file.

BRIEF DESCRIPTION OF THE DRAWINGS

FIG. 6 is a schematic diagram of a written structure of a pattern file.

DETAILED DESCRIPTION OF THE EMBODIMENTS

The present disclosure will be further clarified below in combination with the accompanying drawings and specific embodiments. It should be understood that these examples are only used to illustrate the present disclosure and not to limit the scope of the present disclosure. Modifications made by those skilled in the art in various forms of valence all fall within the scope defined by the appended claims of the present application.

An automatic learning method for a digital test vector, as shown in FIGS. 2-7, includes the following steps.

Step 1, a pattern file is written, the pattern file including an input pin timing and an output pin timing, wherein the input pin timing is provided by a device under test, and includes a clock timing, a drive data timing and an enable signal timing. The output pin timing is configured to be in a learning state. During writing of the pattern file, a user only need to care about an input timing of the device under test, that is, the user only writes pin data such as Driver and Clk, and will not care about output pin data; and the user writes a learning state for an output pin within certain necessary time. By running the pattern file, a pattern source file is corrected by means of a pin state recorded in History Ram, so as to obtain a pattern file that satisfies a running logic and can be used by the user; and the development difficulty and the debugging time are greatly reduced. In addition, in most cases, the depth of History Ram supported by hardware is limited. In order to break through the limitations of hardware, soft algorithm processing is performed in software, so that the user do not need to manually set parameters frequently to learn a pattern with a large number of cycles. A method for configuring the output pin timing to be in the learning state is describing a data bit of the output pin timing by "E".

Step 2, the pattern file is run, and a running state is recorded.

Step 3, recorded running state data is read, and an output pin state, recorded within certain time, in the running state data is acquired.

Step 4, the output pin timing in the pattern file run at step 2 is corrected according to the output pin state acquired at step 3 to obtain a corrected output timing, thus obtaining a corrected pattern file. "E" at the corresponding data bit of the output pin timing in the pattern file is replaced by the output pin state acquired at step 3 to obtain the corrected output pin timing.

Step 5, steps 2-4 are executed on the corrected pattern file obtained at step 4 until the corrected pattern file is within a set threshold range, and the correction of the pattern file is completed to obtain a final pattern file.

Figure 4:
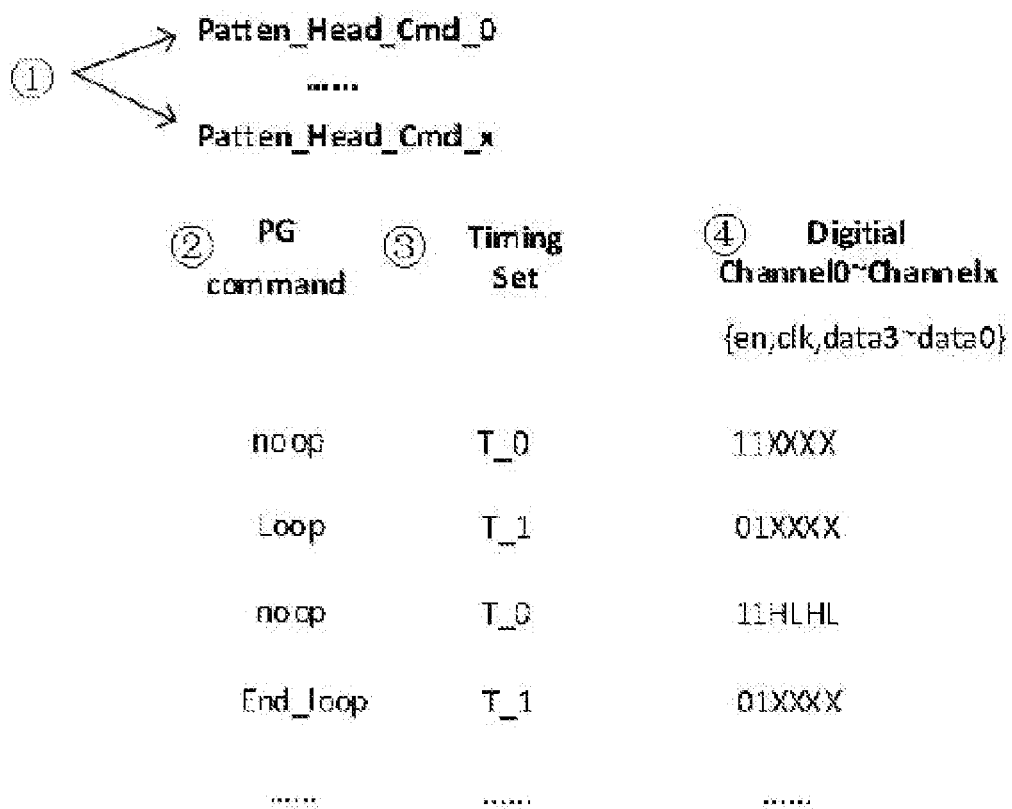
FIG. 4 is an illustration of a structure of a pattern file.

As shown in FIG. 4, an illustration of a structure of the Pattern file is as follows:

① is a Pattern Head command, which is used to define external file information (such as TsetMap and Pin Map) referenced by the Pattern file.

② is a command name of each row of Pattern. This command controls an execution order of the PG.

③ is a timing code of each line of Pattern, each timing code defining a set of information, including: cycle, time edge, waveform, etc.

④ is channel data of each row of Pattern. Each column represents one channel; each symbol represents a channel level; 1 is a drive high level; 0 is a drive low level, which is input by the device under test DUT; H is a compare high level; L is a compare low level, which is used to be compared with an output of the DUT output.

Figure 5:
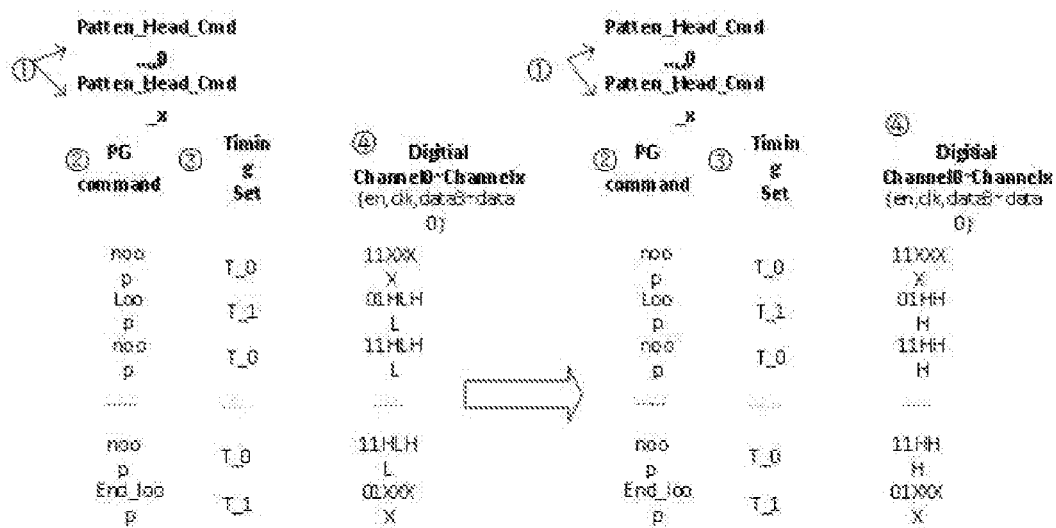
FIG. 5 is a schematic diagram of improvement of a pattern file.
Figure 7:
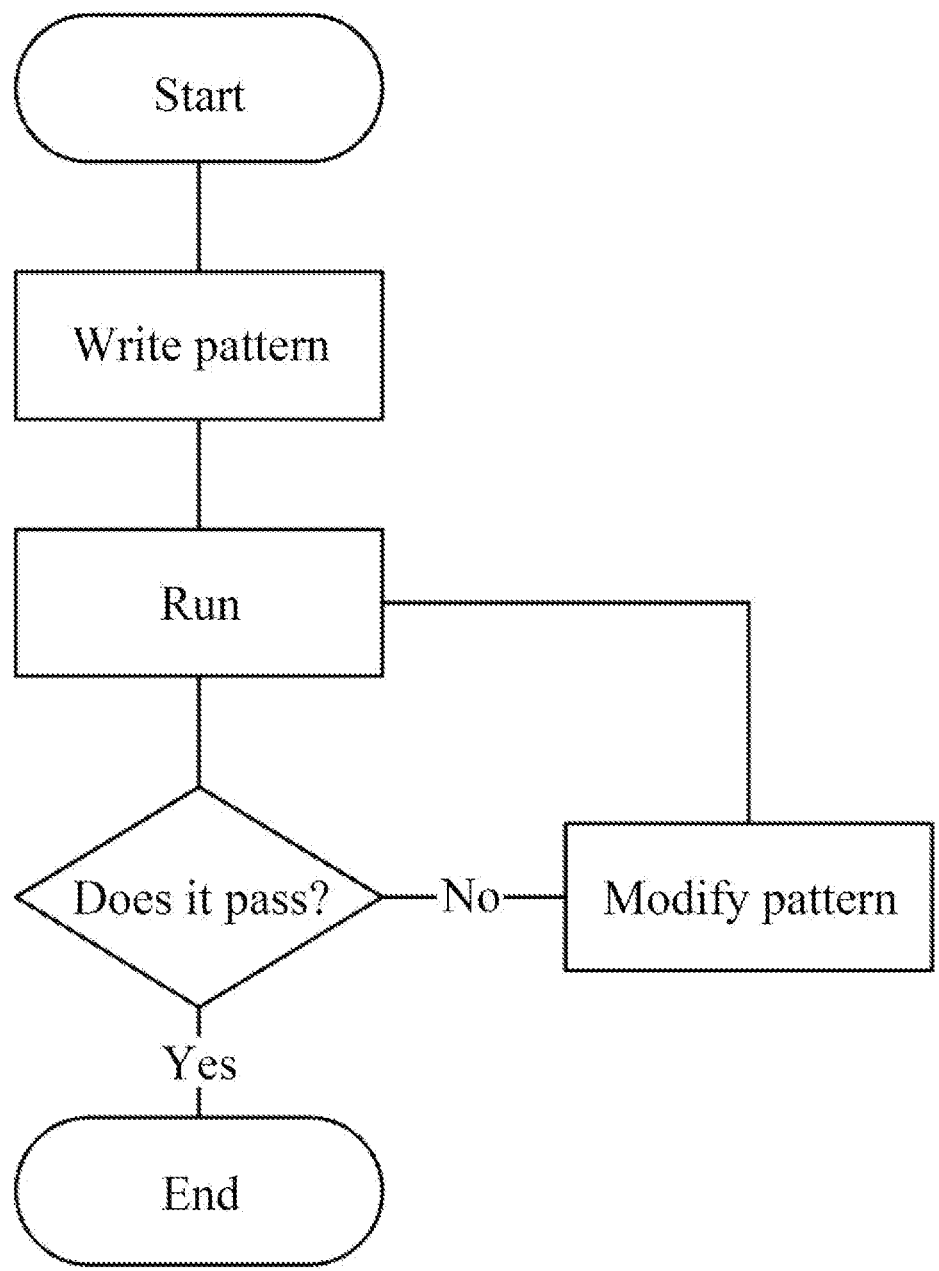
FIG. 7 is a flow chart of writing of a pattern file.

As shown in FIG. 5, the schematic diagram of improvement of the pattern file is as follows:

The schematic diagram on the left of FIG. 5 traditionally describes a pattern file, including columns of clock, data, and enable pin, and level values at the current time are represented row by row. It can be found that due to the difference of data, bits of different data need to be repeatedly filled within one repeated series timing.

The schematic diagram on the right of FIG. 5 describes an improved method in the present disclosure. Improvement is carried out on the basis of the traditional method for describing the pattern file. The data bits are described by a unified "E", which makes a complete series timing described in the pattern file have multiplexability. Loading, moving in and moving out commands are added in the pattern file. After test equipment parses the pattern file, data by an upper computer is loaded, moved in and moved out at corresponding time. At the same time, loop commands can be used, so that the series timing is cyclically used; and only different data need to be graphically controlled to be input and compared.

As shown in FIG. 6, when writing a pattern file, a user only needs to write a specific clock timing, drive data, and an enable signal, and does not need to care about the characteristic of an output of a chip. Through a self-learning function, after the running of the pattern file is completed, the output characteristic of the chip can be obtained under an input condition of a target, which greatly reduces the difficulty of vector writing and debugging.

Figure 1:
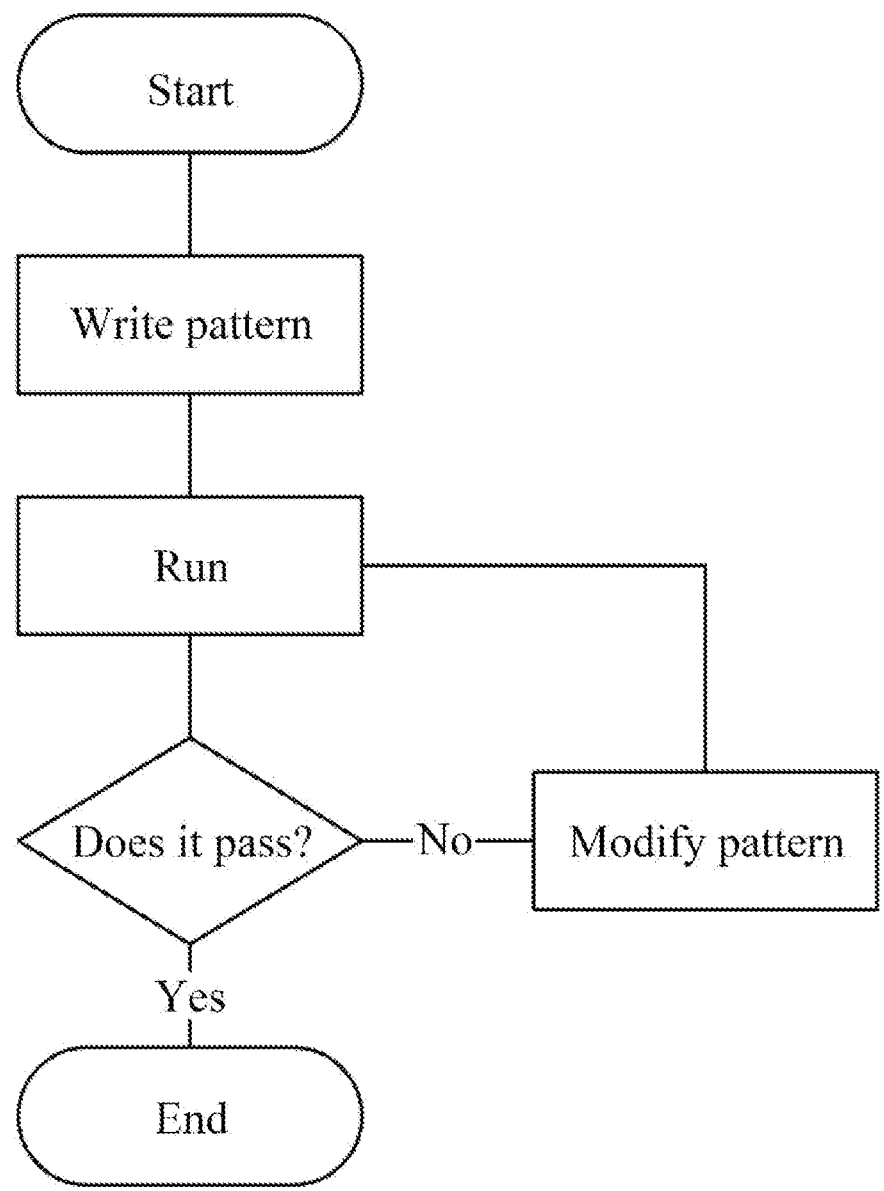
FIG. 1 is an existing flow of debugging of a pattern file.
Figure 2:
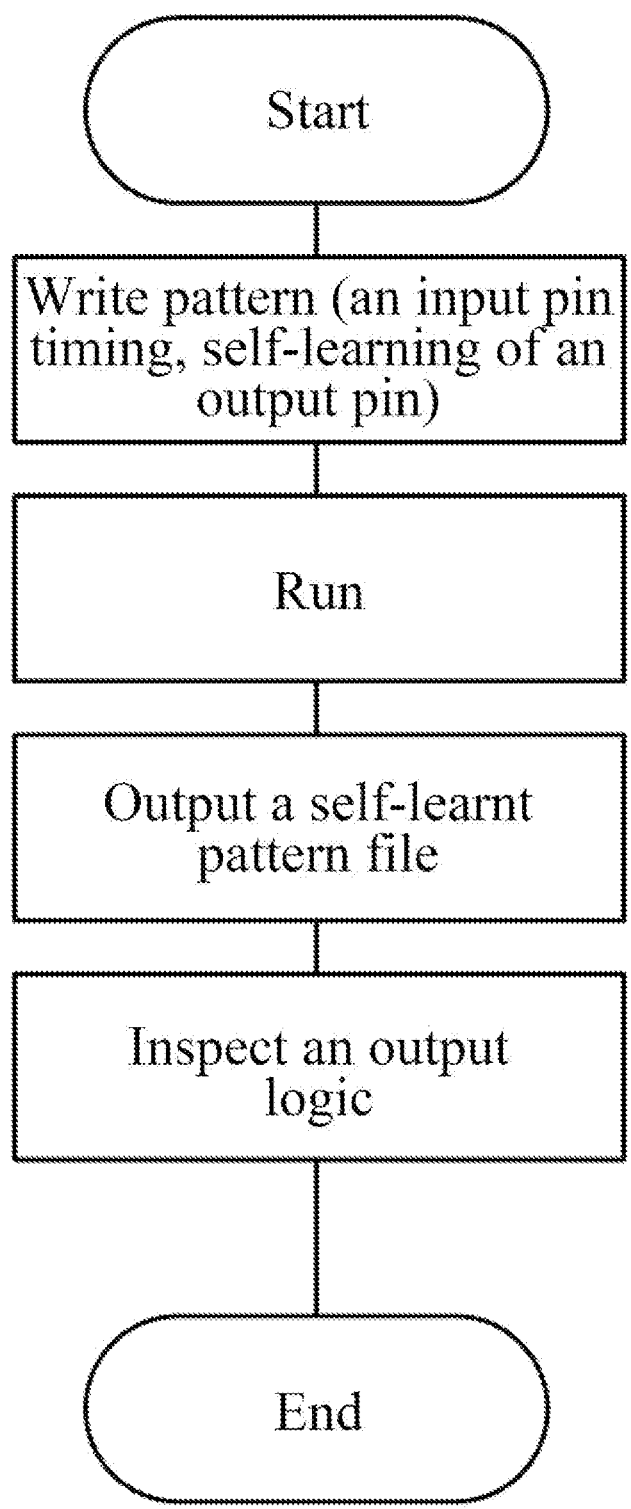
FIG. 2 is an improved flow of debugging of a pattern file.
Figure 3:
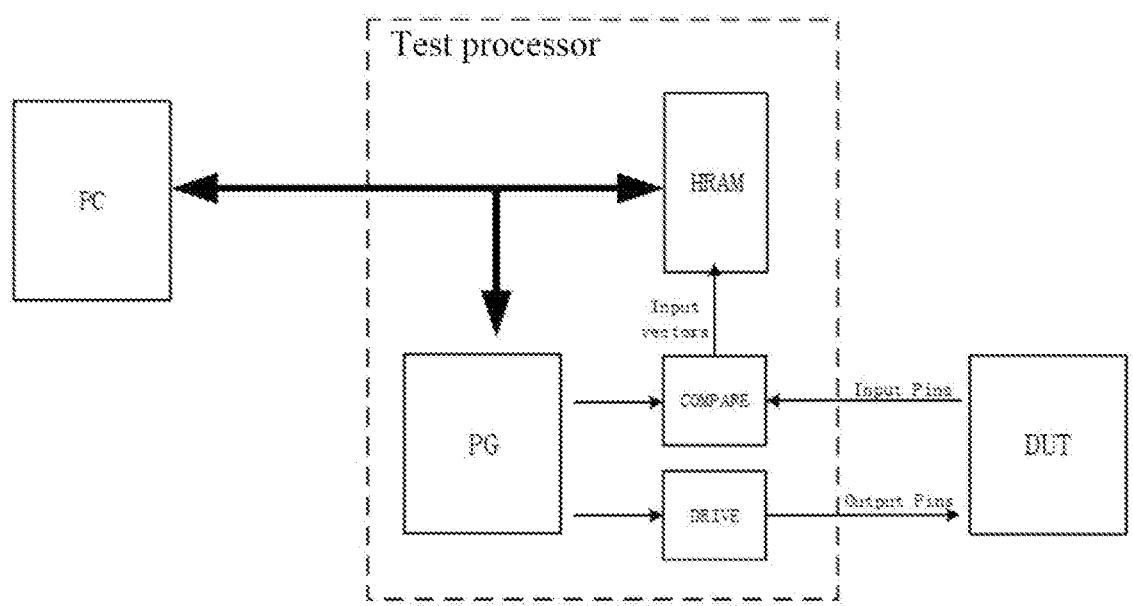
FIG. 3 is a schematic diagram of a self-learning structure of a pattern file.

An automatic learning system for a digital test vector, as shown in FIG. 3, includes an upper computer, a pattern generator PG, a driver DRIVER, a comparator COMPARE and a history random access memory HRAM. The upper computer is a Personal Computer (PC).

The upper computer is configured for writing a pattern file, and sending written pattern file information to the pattern generator. The pattern file includes an input pin timing and an output pin timing. The upper computer is configured for generating an information reading control signal, reading, by means of the information reading control signal, an output pin timing based on the output pin state and recorded in the history random access memory HRAM, and correcting, according to the output pin timing based on the output pin state, the output pin timing in the pattern file to obtain a corrected output pin timing, thus obtaining a corrected pattern file.

The pattern generator PG is configured for performing parsing according to the pattern file sent by the upper computer to obtain the input pin timing and the output pin timing, and sending the input pin timing and the output pin timing to the driver DRIVER and the comparator COMPARE. The full name of the pattern generator PG is pattern generator, which is mainly in charge of generating a pattern file signal.

The driver DRIVER generates a drive signal according to the input pin timing and the output pin timing to drive a device under test.

The comparator COMPARE collects an output pin state generated by the device under test, compares the output pin state with the output pin timing, fills a corresponding position in the output pin timing with the output pin state to obtain the output pin timing based on the output pin state, and sends the input pin timing and the output pin timing based on the output pin state to the history random access memory HRAM.

The history random access memory HRAM is configured for storing an input pin timing and an output pin timing based on an output pin state. The full name of HRAM is History Random Access Memory, which has a main function of recording results of actual running of the pattern, and storing actual data of each cycle for reading by the upper computer.

After the user writes an input logic signal of a device under test, an output state does not need to be written according to a specific logic, and output pin data only needs to be written as "E". The self-learning function is checked when the pattern file is run, so that a pattern file for the specific logic of the device under test can be generated. The generated pattern file can be used as a test standard of the device under test.

In the self-learning of the pattern file, a failure vector is corrected using a result captured in the HRAM. The failure vector can be updated using a learned vector. Expect data is changed to match a value retrieved from the HARM, so that the expect data can match comparator data, or the expect data is changed to be X, so as to ignore the failure.

Under normal circumstances, the storage space of a hardware board card is limited. In order to support the problem that the storage space is limited if there are a large number of timings, segmentation is adopted inside software. What the user see is that the entire pattern file is learned at one time. The operation flow of the user is greatly simplified.

The self-learning function achieved in this way greatly reduces the complexity of writing of the pattern file and the related debugging complexity. Furthermore, this function is also very convenient to use. The user can complete the corresponding function only by determining whether to start this function.

The above describes only the preferred embodiments of the present disclosure. It should be noted that those of ordinary skill in the art can further make several improvements and retouches without departing from the principles of the present disclosure. These improvements and retouches shall all fall within the protection scope of the present disclosure.

What is claimed is:

1. An automatic learning method for a digital test vector, comprising the following steps:
    step 1, writing a pattern file, the pattern file comprising an input pin timing and an output pin timing, wherein the input pin timing is provided by a device under test, and the output pin timing is configured to be in a learning state; a method for configuring the output pin timing to be in the learning state is describing a data bit of the output pin timing by "E";
    step 2, running the pattern file, and recording a running state;
    step 3, reading recorded running state data, and acquiring an output pin state, recorded within certain time, in the running state data;
    step 4, correcting the output pin timing in the pattern file run at step 2 according to the output pin state acquired at step 3 to obtain a corrected output timing, thus obtaining a corrected pattern file;
    a method for correcting the output pin timing in the pattern file run at step 2 is replacing "E" at the corresponding data bit of the output pin timing in the pattern file by the output pin state acquired at step 3 to obtain the corrected output pin timing;
    step 5, executing steps 2-4 on the corrected pattern file obtained at step 4 until the corrected pattern file is within a set threshold range, and completing the correction of the pattern file to obtain a final pattern file.

2. The automatic learning method for the digital test vector according to claim 1, wherein the input pin timing in step 1 comprises a clock timing, a drive data timing and an enable signal timing.

3. An automatic learning system for a digital test vector, comprising an upper computer and a test processor, wherein the test processor comprises a pattern generator PG, a driver DRIVER, a comparator COMPARE and a history random access memory HRAM, wherein:
    the upper computer is configured for writing a pattern file, and sending written pattern file information to the pattern generator; the pattern file comprises an input pin timing and an output pin timing; the upper computer is configured for generating an information reading control signal, reading, by means of the information reading control signal, the output pin timing based on an output pin state and recorded in the history random access memory HRAM, and correcting, according to the output pin timing based on the output pin state, the output pin timing in the pattern file to obtain a corrected output pin timing, thus obtaining a corrected pattern file;
    the pattern generator PG is configured for performing parsing according to the pattern file sent by the upper computer to obtain the input pin timing and the output pin timing, and sending the input pin timing and the output pin timing to the driver DRIVER and the comparator COMPARE;
    the driver DRIVER generates a drive signal according to the input pin timing and the output pin timing to drive a device under test;
    the comparator COMPARE collects the output pin state generated by the device under test, compares the output pin state with the output pin timing, fills a corresponding position in the output pin timing with the output pin state to obtain the output pin timing based on the output pin state, and sends the input pin timing and the output pin timing based on the output pin state to the history random access memory HRAM;
    the history random access memory HRAM is configured for storing the input pin timing and the output pin timing based on the output pin state.

4. The automatic learning system according to claim 3, wherein the upper computer is a Personal Computer (PC).

\* \* \* \* \*